(12) United States Patent
Raymond

(10) Patent No.: US 9,988,066 B2
(45) Date of Patent: Jun. 5, 2018

(54) SNOW RAFT HAVING A PLURALITY OF ADJUSTABLE SPEED CONTROL STUDS

(71) Applicant: Mercier Raymond, Piedmont (CA)

(72) Inventor: Mercier Raymond, Piedmont (CA)

(*) Notice: Subject to any disclaimer, the term of this patent is extended or adjusted under 35 U.S.C. 154(b) by 118 days.

(21) Appl. No.: 15/234,188

(22) Filed: Aug. 11, 2016

(65) Prior Publication Data

US 2017/0050664 A1    Feb. 23, 2017

(30) Foreign Application Priority Data

Aug. 18, 2015   (GB) .................................. 1514686.3

(51) Int. Cl.
*B62B 15/00* (2006.01)
*B62B 17/08* (2006.01)
*B62B 17/06* (2006.01)

(52) U.S. Cl.
CPC ............ *B62B 15/00* (2013.01); *B62B 17/063* (2013.01); *B62B 17/08* (2013.01); *B62B 2501/04* (2013.01)

(58) Field of Classification Search
CPC . B62B 15/00; B62B 17/063; B62B 2501/065; B62B 17/08
USPC ................................ 280/18, 19, 28.11; 188/8
See application file for complete search history.

(56) References Cited

U.S. PATENT DOCUMENTS

| | | | | |
|---|---|---|---|---|
| 3,635,490 A | * | 1/1972 | Demaree | B62B 13/06 280/18 |
| 3,948,536 A | * | 4/1976 | Konrad | B62B 13/00 280/18 |
| 4,199,163 A | * | 4/1980 | Nelson | B62B 13/00 280/18.1 |
| 4,524,984 A | * | 6/1985 | Axelson | B62B 15/00 280/18 |
| 5,899,782 A | * | 5/1999 | Martin | B63B 35/815 114/253 |
| 5,957,471 A | * | 9/1999 | Weeks | A63C 5/03 280/18 |
| 2006/0273533 A1 | * | 12/2006 | Fireman | B62B 13/08 280/18 |
| 2012/0299256 A1 | * | 11/2012 | Bromley | B62B 13/06 280/18 |
| 2012/0309550 A1 | * | 12/2012 | Raymond | A63G 21/12 472/128 |
| 2016/0075364 A1 | * | 3/2016 | Raymond | B62B 17/005 280/21.1 |

FOREIGN PATENT DOCUMENTS

| CA | 2240775 C | * | 11/2000 | ............. A63C 5/031 |
|---|---|---|---|---|
| FR | 2584990 A1 | * | 1/1987 | ............. B62B 15/00 |

* cited by examiner

*Primary Examiner* — Ruth Ilan

(57) ABSTRACT

A snow raft comprises a plurality of adjustable speed control studs to control the speed of the raft wherein adjustments are made by way of threading and unthreading the studs located within threaded sockets.

1 Claim, 3 Drawing Sheets

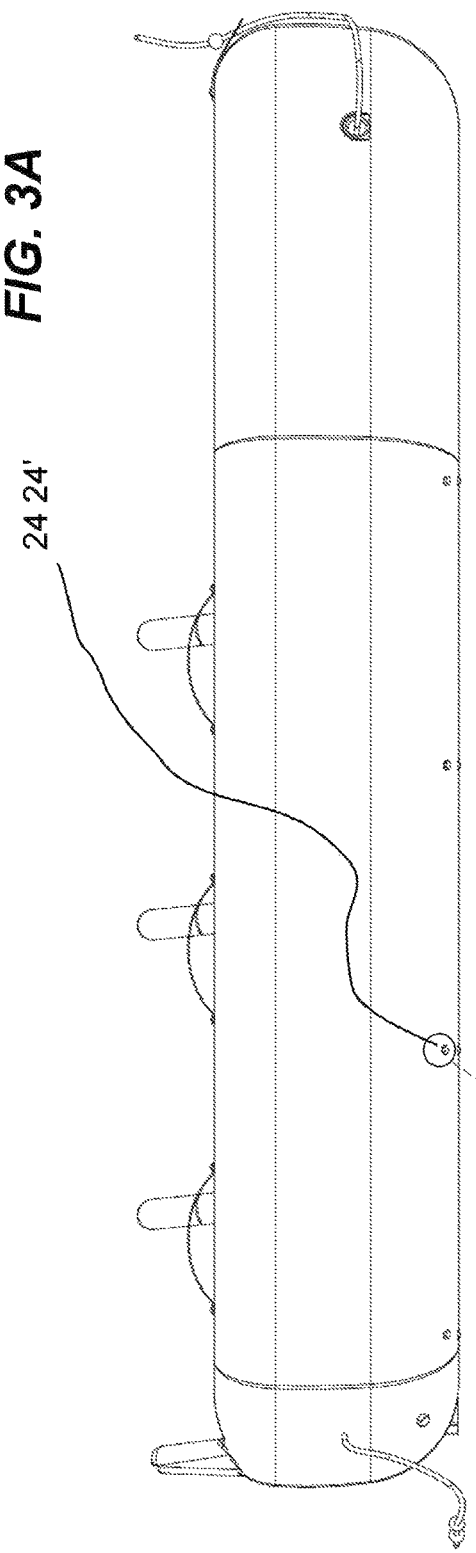
FIG. 3A
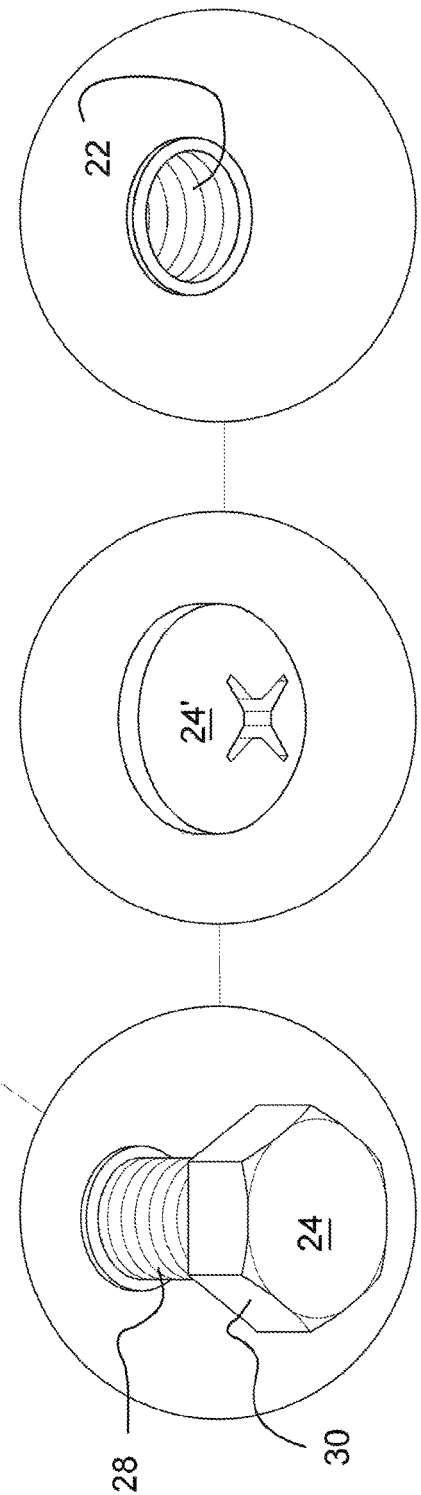
FIG. 3D
FIG. 3C
FIG. 3B

SNOW RAFT HAVING A PLURALITY OF ADJUSTABLE SPEED CONTROL STUDS

FIELD OF THE INVENTION

The present invention relates generally to snow bound vehicles but more particularly to a snow raft having a plurality of adjustable speed control studs.

BACKGROUND OF THE INVENTION

Various winter activities have been developed over the past few decades. A lot of those activities consist in making just about anything slide. That can include inflatable inner tubes, carpets make of smooth plastic. A favorite is the inflatable dinghy. Theses crafts need a lot of maintenance and are costly to begin with. Moreover, they were not designed for use on snow and are therefore not very controllable. There is room from improvement in that field.

SUMMARY OF THE INVENTION

In view of the foregoing disadvantages inherent in the known devices now present in the prior art, the present invention, which will be described subsequently in greater detail, is to provide objects and advantages which are:

To provide for a low cost resistant raft that has features that enhances control over its movement on snow.

In order to do so, the invention comprises a plurality of adjustable speed control studs to control the speed of the raft wherein adjustments are made by way of threading and unthreading the studs located within threaded sockets.

There is a plurality of built-in seats from which a backrest extends integrally therefrom.

A rudder member is located on the underside of the raft on one of its sides and is used for reducing sideways sliding and help keep the raft on course.

There is at least one carrying handle is attached to a side of the raft for carrying the raft.

A pull cord is attached to the front of the raft.

Different shapes of studs can be used at once to further customize the speed according to snow conditions.

The studs shapes can include but are not limited to hexagonal, octagonal, circular, flat head, and rounded head.

The studs have a threaded portion configured to thread into the threaded socket, and a head portion that interacts with the snow.

The raft id preferably a solid body, rotomoulded monohull structure.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter which contains illustrated preferred embodiments of the invention.

BRIEF DESCRIPTION OF THE DRAWINGS

FIGS. 3A-d Side view of the raft with isometric views of the studs and threaded socket.

DETAILED DESCRIPTION

Figure 1:
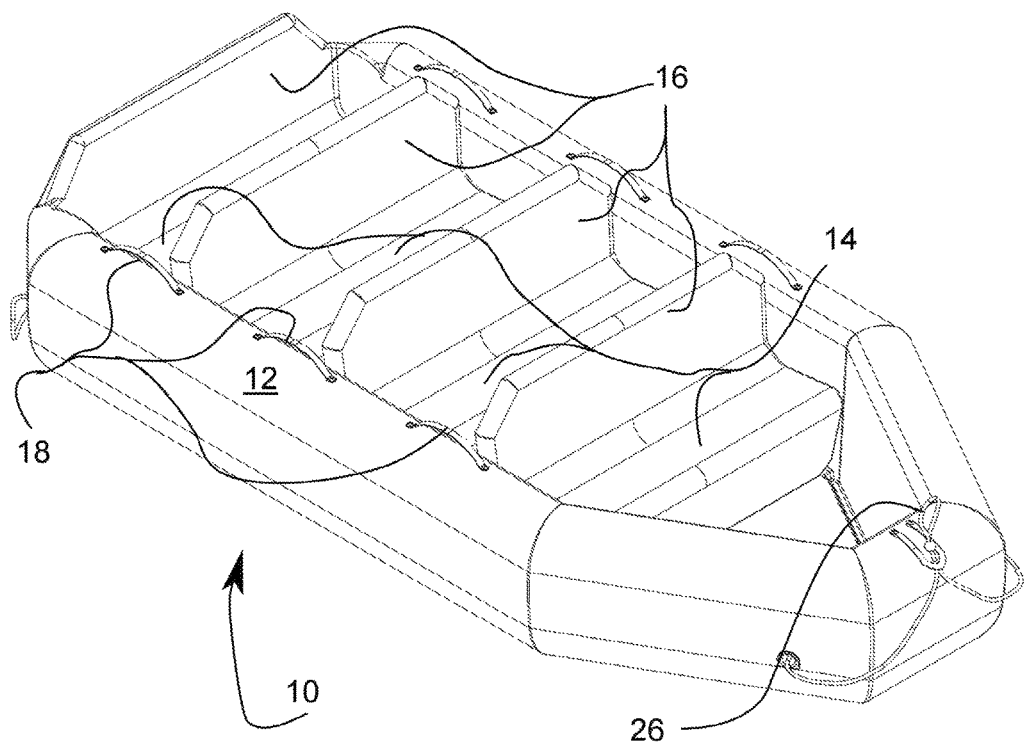
FIG. 1 Isometric front view of the invention.
Figure 2:
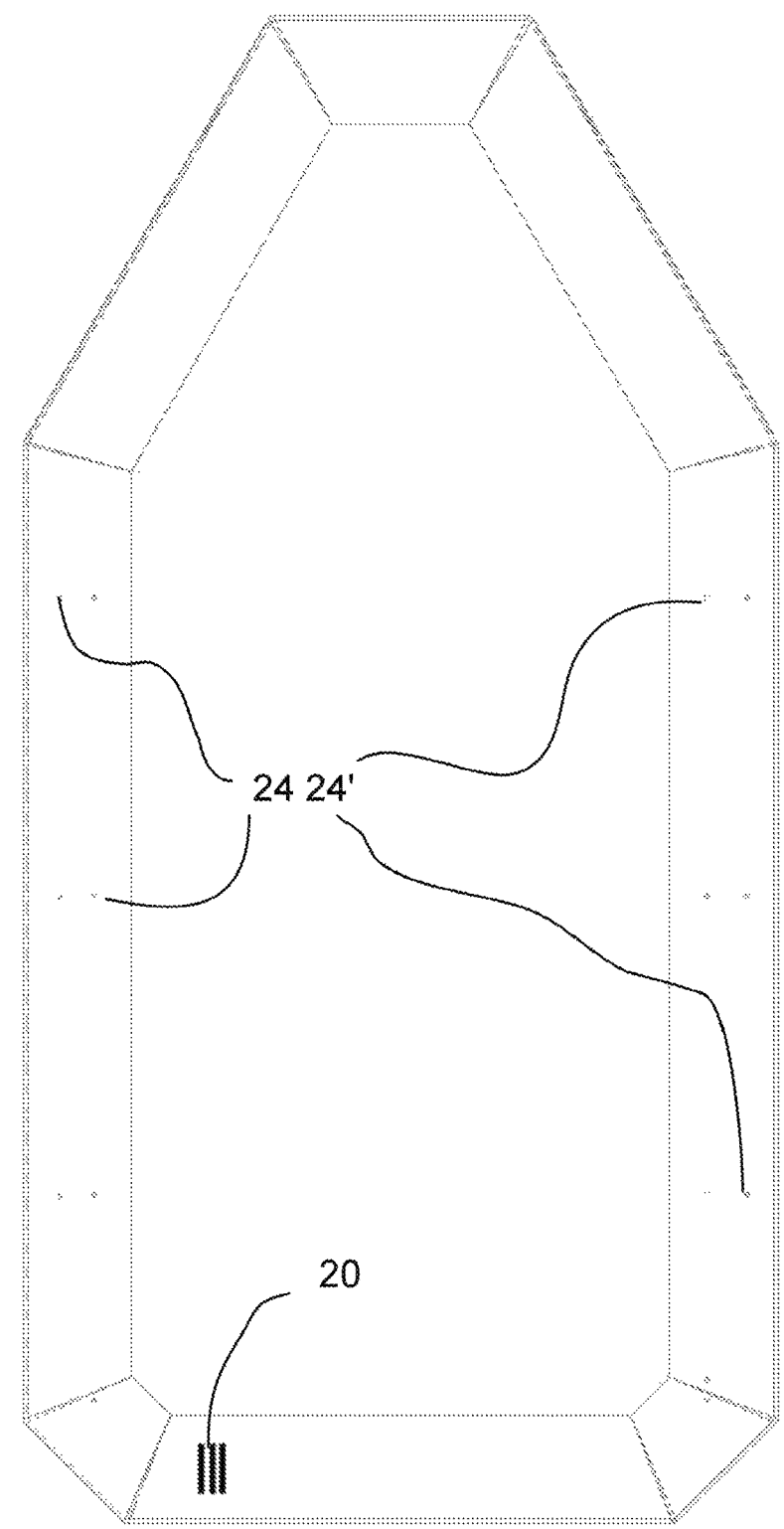
FIG. 2 Bottom view of the invention.

A raft (10) has a main body (12) configured and shaped similarly to an inflatable raft but preferably made from a rigid material. It has a plurality of built-in seats (14), further comprised of a back rest (16), and carrying handles (18), which can also act as securing handles for the passengers.

A rudder member (20) is located on the underside of the raft (10) on one of its sides and is used for reducing sideways sliding and help keep the raft (10) on course, Retractable speed control studs (24, 24') control speed of the raft (10) and are adjustable and interchangeable according to the type of snow conditions. For example, when snow is hard and icy, speed needs to be reduced as much as possible to keep the raft (10) going at a safe speed. In order to do so, multi faceted studs (24) (for example a hexagonal stud as shown in FIG. 3b) are used. When snow conditions are less slippery, a smoother round faced stud (24') can be used as shown in FIG. 3c. In both cases, the studs (24, 24') can be protracted or retracted by threading in unthreading them within their threaded sockets (22). When snow is soft and sticky, friction can be further reduced by removing all studs (24, 24') from their sockets (22), as shown in FIG. 3d. Also, different shapes of studs (24, 24') can be used at once to further customize the speed according to snow conditions. The studs (24, 24') have a threaded portion (28) configured to thread into the threaded socket (22), and a head portion (30) that interacts with the snow.

The raft (10) is made using a rotomoulding process which allows for it to be a single, monohull structure, which makes it even stronger than if made from several attached parts. There are of course a few attached parts such as the carrying handles (18) the studs (24, 24'), the rudder member (20) and a pull cord (26).

The advantage of a solid body raft (10) over an inflatable one has to do with longevity and better endurance to cold weather and other factors such as air pressure variations over difference in temperatures which can affect the stiffness of an inflatable raft more in cold weather than in warmer weather since body heat of friction can have a much greater effect when at freezing temperatures.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

The invention claimed is:

1. A snow raft for use on snowy inclined terrain consisting of a shape that is longer than it is wider and having one end that is generally triangular in shape and an opposite end that is generally flat in shape; the shape being generated by way of rotomoulding process so as to create a monohull structure composed of five conjoined continuous generally cylindrical elements joined at both extremities by a generally flat member which defines the opposite end; the five generally cylindrical elements define an interior space having a bottom; the interior space as at least three built-in seats; each built-in seat has a horizontal seating portion and a perpendicularly extending vertical backrest extending integrally from the seating portion of each built-in seat and wherein the last built-in seat has the flat member also forming the backrest extending integrally from the last built-in seat; the underside of the raft has a rudder to prevent sideways sliding; the underside of the raft further comprises a plurality of retractable studs that are adjustable and interchangeable by way of threading and unthreading so as to control the speed of the raft by varying the friction coefficient.

* * * * *